United States Patent
He et al.

(10) Patent No.: US 11,388,106 B2
(45) Date of Patent: Jul. 12, 2022

(54) METHOD, DEVICE, AND COMPUTER PROGRAM PRODUCT FOR EDGE RESOURCE AGGREGATION

(71) Applicant: EMC IP Holding Company LLC, Hopkinton, MA (US)

(72) Inventors: Bin He, Shanghai (CN); Chenxi Hu, Beijing (CN); Lian Li, Shanghai (CN); Baorui Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/108,640

(22) Filed: Dec. 1, 2020

(65) Prior Publication Data
US 2022/0141151 A1 May 5, 2022

(30) Foreign Application Priority Data
Oct. 30, 2020 (CN) .......................... 202011191619.7

(51) Int. Cl.
| | |
|---|---|
| *G06F 15/173* | (2006.01) |
| *H04L 47/78* | (2022.01) |
| *H04L 47/762* | (2022.01) |
| *H04L 47/70* | (2022.01) |
| *H04L 67/568* | (2022.01) |

(52) U.S. Cl.
CPC .......... *H04L 47/781* (2013.01); *H04L 47/762* (2013.01); *H04L 47/827* (2013.01); *H04L 67/568* (2022.05)

(58) Field of Classification Search
CPC . H04L 47/781; H04L 67/2842; H04L 47/827; H04L 47/762
See application file for complete search history.

(56) References Cited

U.S. PATENT DOCUMENTS

| | | | |
|---|---|---|---|
| 2008/0228920 A1* | 9/2008 | Souders | H04L 67/2842 709/226 |
| 2019/0158606 A1* | 5/2019 | Guim Bernat | H04W 4/40 |
| 2019/0386883 A1* | 12/2019 | Bhat | H04L 41/0803 |
| 2020/0008044 A1* | 1/2020 | Poornachandran | H04W 60/00 |
| 2020/0104184 A1* | 4/2020 | Subramanian | H04L 41/5003 |
| 2020/0136906 A1* | 4/2020 | Guim Bernat | G06F 9/505 |
| 2020/0137148 A1* | 4/2020 | Segal | H04N 21/23106 |
| 2020/0196203 A1* | 6/2020 | Yang | H04W 36/10 |

FOREIGN PATENT DOCUMENTS

CN 111694636 A * 9/2020

OTHER PUBLICATIONS

ETSI Mobile Technologies, "Why Do We Need 5G?" https://www.etsi.org/technologies/5g, Mar. 4, 2020, 6 pages.
U.S. Appl. No. 16/907,405 filed in the name of Bin He et al., filed Jun. 22, 2020, and entitled "Method, Device, and Computer Program Product for Managing a Mobile Terminal."

* cited by examiner

*Primary Examiner* — Cheikh T Ndiaye
(74) *Attorney, Agent, or Firm* — Ryan, Mason & Lewis, LLP

(57) ABSTRACT

Embodiments of the present disclosure provide a method, a device, and a computer program product for edge resource aggregation. In one embodiment, a second edge device to which data associated with a first edge device will be transmitted is determined in an edge device cluster. Then, the data associated with the first edge device is transmitted to the second edge device. In this way, resources of multiple edge devices may be aggregated, thereby improving network efficiency and stability.

20 Claims, 9 Drawing Sheets

METHOD, DEVICE, AND COMPUTER PROGRAM PRODUCT FOR EDGE RESOURCE AGGREGATION

RELATED APPLICATION(S)

The present application claims priority to Chinese Patent Application No. 202011191619.7, filed Oct. 30, 2020, and entitled "Method, Device, and Computer Program Product for Edge Resource Aggregation," which is incorporated by reference herein in its entirety.

FIELD

Embodiments of the present disclosure generally relate to computer technologies, and in particular to a method, a device, and a computer program product for edge resource aggregation.

BACKGROUND

In a fifth-generation (also known as 5G) network, Multi-Access Edge Computing (MEC) brings great benefits to network performance and user experience. Use of edge stations (also known as edge devices) may provide services such as ultra-low delay connections, real-time data processing and management, and local caching of content at the edge of the network.

The edge devices usually serve their own geographic areas, their capacity and size are much smaller than those of a data center, and they have their own limits. Generally, in the network deployment stage, the edge devices are deployed by an operator according to the network topology and a load level of an area. However, a data traffic model of each area may be different at different times, rather than remaining unchanged. In one area, there may be a large amount of data traffic at a certain time of a day, but much lower amounts at other times. However, upgrading the configuration level of the edge devices in an area simply because of an occasional traffic increase may cause a substantial waste of resources.

SUMMARY

Generally, a method, a device, and a computer program product for edge resource aggregation are provided in embodiments of the present disclosure.

In a first aspect, the embodiments of the present disclosure provide a method for edge resource aggregation. In the method, a second edge device to which data associated with a first edge device will be transmitted is determined in an edge device cluster. Then, the data associated with the first edge device is transmitted to the second edge device.

In a second aspect, the embodiments of the present disclosure provide a device for edge resource aggregation. The device includes a processor and a memory storing computer-executable instructions. The computer-executable instructions, when executed by the processor, cause the device to perform actions. The actions include: determining, in an edge device cluster, a second edge device to which data associated with a first edge device will be transmitted; and transmitting the data associated with the first edge device to the second edge device.

In a third aspect, the embodiments of the present disclosure provide a computer program product. The computer program product is tangibly stored on a non-transitory computer-readable medium and includes machine-executable instructions. The machine-executable instructions, when executed, cause a machine to execute the method according to the first aspect.

It should be understood that the content described in this Summary is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above-mentioned and other features, advantages, and aspects of the embodiments of the present disclosure will become more apparent with reference to the accompanying drawings and the following detailed description. In the accompanying drawings, identical or similar reference numerals represent identical or similar elements, in which.

DETAILED DESCRIPTION

Figure 1:
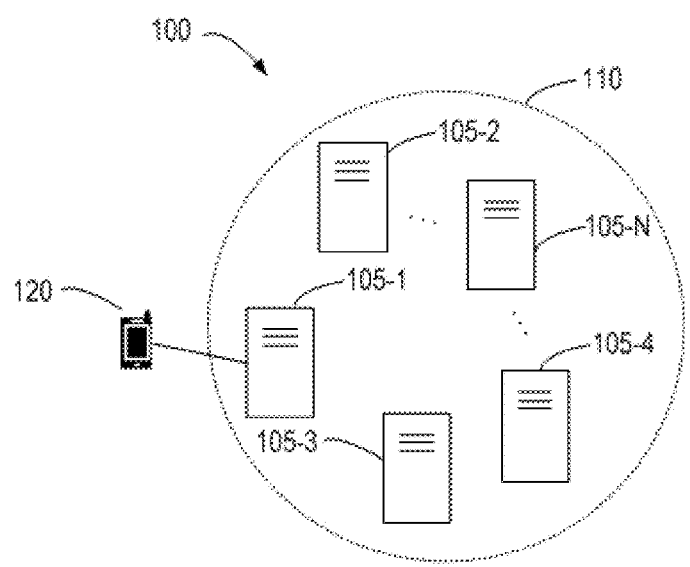
FIG. 1 shows an example environment in which embodiments of the present disclosure may be implemented.

Illustrative embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

The term "edge device" as used herein refers to a device that is deployed at the edge of a network close to a user and can provide resources and services such as computing, storage, and networking. As an example, an edge device may include a host, a server, or the like.

The term "terminal device" as used herein refers to a device used by a user to access the network. As an example, a terminal device may include a mobile phone, a smart phone, a personal digital assistant, a notebook computer, a tablet computer, a vehicle-mounted device, a wearable device, or the like.

As used herein, the term "include" and variations thereof mean open-ended inclusion, that is, "including but not limited to." The term "based on" is "based at least in part on." The term "one embodiment" means "at least one embodiment," and the term "another embodiment" means "at least one other embodiment." Relevant definitions of other terms will be given in the description below.

The terms "first," "second," etc. used herein may be used herein to describe various elements, and these elements should not be limited by these terms. These terms are only used to distinguish one element from another. For example, without departing from the scope of example embodiments, a first element may be referred to as a second element, and similarly, the second element may be referred to as the first element. As used herein, the term "and/or" includes any and all combinations of one or more of the listed terms.

Edge stations are deployed close to a user. Compared with traditional data centers (for example, cloud servers), the edge stations have a greater number but smaller size. Each edge station has its own geographic boundary and resource constraints. A single edge source device can only provide a certain level of service due to its upper limit of capacity.

Initially, in the network deployment stage, the edge devices are configured by an operator according to the network topology and a load level of the area. However, the network load is not always at a stable level, and it may change with different factors such as time and weather. Moreover, it may be affected by, for example, various types of incidents. For example, during temporary gatherings or online video programs, connections and traffic volume may greatly exceed the normal level. Due to limited computing power, a single edge device may be overloaded. Moreover, the operator cannot deploy peak loads of the edge devices in the initial stage. When the load exceeds the capacity of the edge device, a network overload problem in terms of such as computing, storage, and network connections may be caused. Therefore, in the case of peak data appearing, network congestion is likely to occur, and it is difficult to meet the user's needs.

It is not feasible to upgrade the configuration level of the edge devices in an area simply because of an occasional traffic increase, which may cause a substantial waste of resources. However, transferring the load directly to a cloud may not only increase a load of the cloud, but also increase a delay, which cannot meet the service quality requirements of time-sensitive traffic.

A single edge station may also be a bottleneck for network access and connections. Due to hardware performance limitations or other reasons such as network congestion, a single edge station may become a bottleneck for data access, and single-point solutions limit network throughput.

In addition, infrastructures with specific functions cannot be deployed on all edge devices. For example, some specific hardware, such as a Globally Unique Identifier (GUID) Partition Table (GPT) hard disk, a Tensor Processing Unit (TPU), and a high-resolution video coder-decoder ("codec"), cannot be deployed at all edge stations due to reasons such as high cost. However, such hardware may be required in certain traffic scenarios. Therefore, demands for such hardware cannot be ignored.

Moreover, a single edge device has storage resource constraints, and it is impractical to deploy all application packages on all edge devices. Moreover, for some applications, data such as training models and maps may need to be loaded together. The lack of data in the edge devices may further aggravate the above problems.

Due to the fact that it is impractical to pre-cache the application packages on all edge devices, significant challenges can arise, especially in a mobile scenario. For example, when a user moves from one edge device to another edge device, it can be difficult to ensure seamless switching to the new edge device for the user during a service process, which may result in interruption of service continuity.

Sometimes, file sharing between users may be achieved by using the edge devices through shareware. However, file uploading and downloading processes may take substantial amounts of time, especially for large files.

Illustrative embodiments of the present disclosure provide a novel architecture for aggregating resources of the edge devices. In the architecture, a group of edge devices is used as an edge device cluster, and resources of the edge device cluster are used as a resource pool to replace resources of a single edge device to provide services. The resources include resources of all aspects such as computing, storage, and network connections. Thus, the edge devices in the edge device cluster may cooperate with each other to provide services together. Therefore, loads of computing, storage, and network connections may be distributed to multiple edge devices in the edge device cluster.

Solutions for cooperation among edge devices may be used. For example, the edge devices that are geographically close to each other may share resources with each other. In this way, the resource capacity may be regarded as a pool, and the possibility of exceeding the overall capacity due to a single edge device may be small.

The architecture may improve service quality in various service scenarios applicable to the edge devices. For example, in a run-time stage, when an edge device reaches a peak capacity or overloads due to an unexpected load or service during a certain period of time, a task that exceeds the capacity of the edge device may be offloaded to other edge devices in the edge device cluster. In this way, the service may be kept running stably when unexpected traffic occurs, thereby providing a smooth and acceptable service level to a user.

In addition, in mobile scenarios, a download delay may be a key factor affecting service continuity. Using the architecture according to the embodiments of the present disclosure, applications may be dynamically deployed in multiple edge devices that reside in a terminal device area. In this way, a user can seamlessly switch to a new edge station in the service, so that service continuity is maintained.

In a data sharing scenario, multiple edge devices in the edge device cluster may cooperate to provide multi-point access, thereby avoiding the single-point bottleneck, greatly reducing the delay, and improving network efficiency and stability.

FIG. 1 shows example environment 100 in which embodiments of the present disclosure may be implemented.

As shown in FIG. 1, environment 100 includes a plurality of edge devices 105-1, 105-2, 105-3, 105-4 . . . 105-N, where N is any positive integer that is suitably greater than 4. These edge devices 105-1 . . . 105-N form edge device cluster 110. For ease of discussion, in the context of the present disclosure, edge devices 105-1 . . . 105-N are also individually or collectively referred to as edge devices 105.

It should be understood that the number of edge devices in edge device cluster 110 shown in FIG. 1 is merely an example and not a limitation. Edge device cluster 110 may also include fewer than 4 edge devices, for example, may include only two edge devices 105-1 and 105-2.

Edge device cluster 110 may be created by a network operator in the network deployment stage. For example, according to service requirements, edge device cluster 110 may be equipped with hardware configurations that meet the requirements. When deploying an application service, an application developer may acquire a label of edge device cluster 110 according to the service requirements, and install and start a corresponding application package.

Alternatively or in addition, edge device cluster 110 may also be dynamically built during a run-time stage, when the edge devices 105 are running. For example, edge device 105-1 may interact with nearby edge devices 105-2 and 105-3, etc., to dynamically build edge device cluster 110 according to traffic requirements such as switch-over, load balancing, and data uploading and/or downloading. In some embodiments, after edge device cluster 110 is built, members of edge device cluster 110 may be dynamically adjusted according to the traffic requirements.

As shown in FIG. 1, environment 100 also includes terminal device 120, which may access edge device 105-1 in edge device cluster 110. Terminal device 120 may be in communication with edge devices 105 by using any suitable communication technologies and according to any suitable communication standards. The scope of the present disclosure is not limited in this respect.

It should be understood that terminal device 120 and edge device 105-1 shown in FIG. 1 are merely examples and not limitations. According to actual service requirements, terminal device 120 may alternatively or simultaneously access one or more other edge devices in edge device cluster 110. For example, in a mobile scenario, when terminal device 120 moves near edge device 105-2, terminal device 120 may switch to be in communication with edge device 105-2. In a data download scenario, terminal device 120 may download one or more parts of data from the plurality of edge devices 105 in edge device cluster 110 at the same time.

By aggregating resources of the plurality of edge devices 105-1 . . . 105-N in edge device cluster 110, loads of computing, storage, and network connections may be distributed among the plurality of edge devices 105-1 . . . 105-N, thereby greatly improving the network throughput.

In order to support resource aggregation of the edge devices, in some embodiments, services of edge devices 105 are expanded. An example of such an arrangement is described below with reference to FIG. 2.

Figure 2:
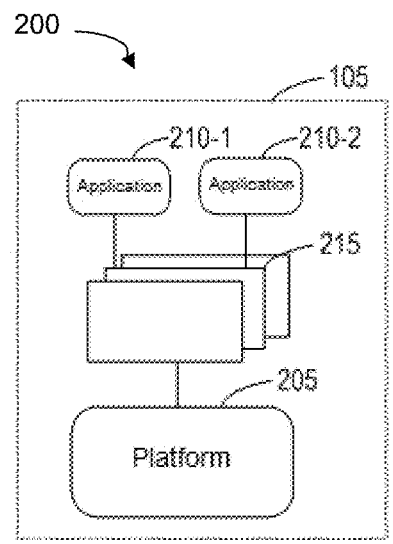
FIG. 2 shows an example structure of an edge device according to some embodiments of the present disclosure.

FIG. 2 shows example structure 200 of edge device 105 according to some embodiments of the present disclosure.

As shown in FIG. 2, service layers 215 are provided between platform 205 of edge device 105 and applications (APPs) 210-1 and 210-2 (also individually or collectively referred to as applications or APPs 210). As a service provider, service layers 215 may provide a service that supplies context information of edge device 105. APPs 210 may serve as service users, and may use service layers 215 to improve application behaviors related to resources such as computing, storage, and networking.

It should be understood that the number of APPs 210 installed on edge device 105 shown in FIG. 2 is merely an example and not a limitation. Any number of APPs 210 may be installed on edge device 105 to implement various services and functions. Examples of APPs 210 include positioning applications, audio and video processing applications, image processing applications, navigation applications, and the like. APPs 210 may be packaged by an application developer, and may be set as a Virtual Machine (VM) or a container.

In addition to APPs 210, platform 205, other edge devices (for example, edge device 105-2), or the cloud may serve as service users to acquire required information about edge device 105. This information may be provided by platform 205 and APPs 210 of edge device 105.

In some embodiments, edge device 105 may provide an Application Programming Interface (API), which may be exposed to local platform 205, APPs 210, other edge devices, and the cloud to acquire context information of edge device 105. The information includes, for example, information about applications hosted by edge device 105, a Network Function (NF), and related services, as well as information about software and hardware configurations and resource utilization of edge device 105. The API may be implemented as a RESTful API or any other API in a suitable format.

In the context of the present disclosure, a service that provides context information of an edge device is also called an Edge Network Information Service (ENIS). The corresponding API is called an Edge Network Information (ENI) API.

The ENI API supports query and subscription through a message broker (not shown) of platform 205, for example, using an issuance/subscription mechanism. An example process of querying ENIS is described below with reference to FIG. 3.

Figure 3:
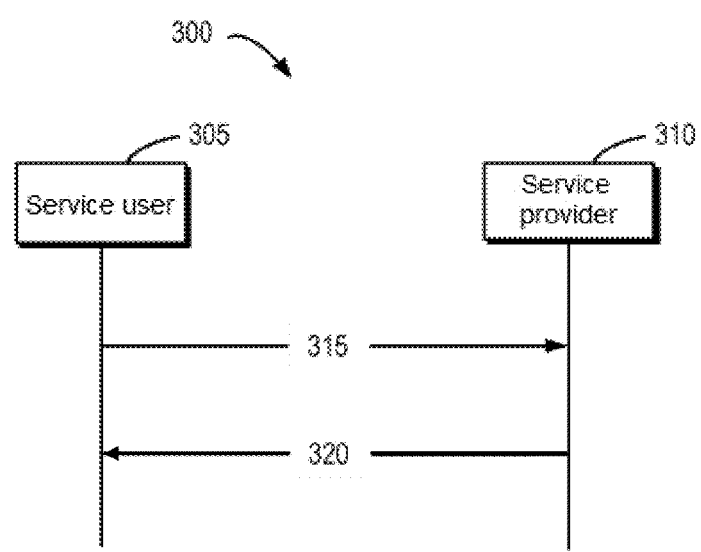
FIG. 3 shows a sequence diagram of an example process of a query service according to some embodiments of the present disclosure.

FIG. 3 shows a sequence diagram of example process 300 of querying ENIS according to some embodiments of the present disclosure;

As shown in FIG. 3, in process 300, service user 305 sends (315) a GET message to service provider 310 to query for ENIS information. In response to the GET message, service provider 310 sends (320) a 200 OK message to service user 305 to return the ENIS information queried for.

In some embodiments, in order to use ENIS in various application scenarios, edge device 105 may provide data management functions other than application packages. For example, a storage management NF may be configured in edge device 105. Through the NF, developers may manage data and application images or container files together in the initial stage or when new applications need to be started.

Figure 4:
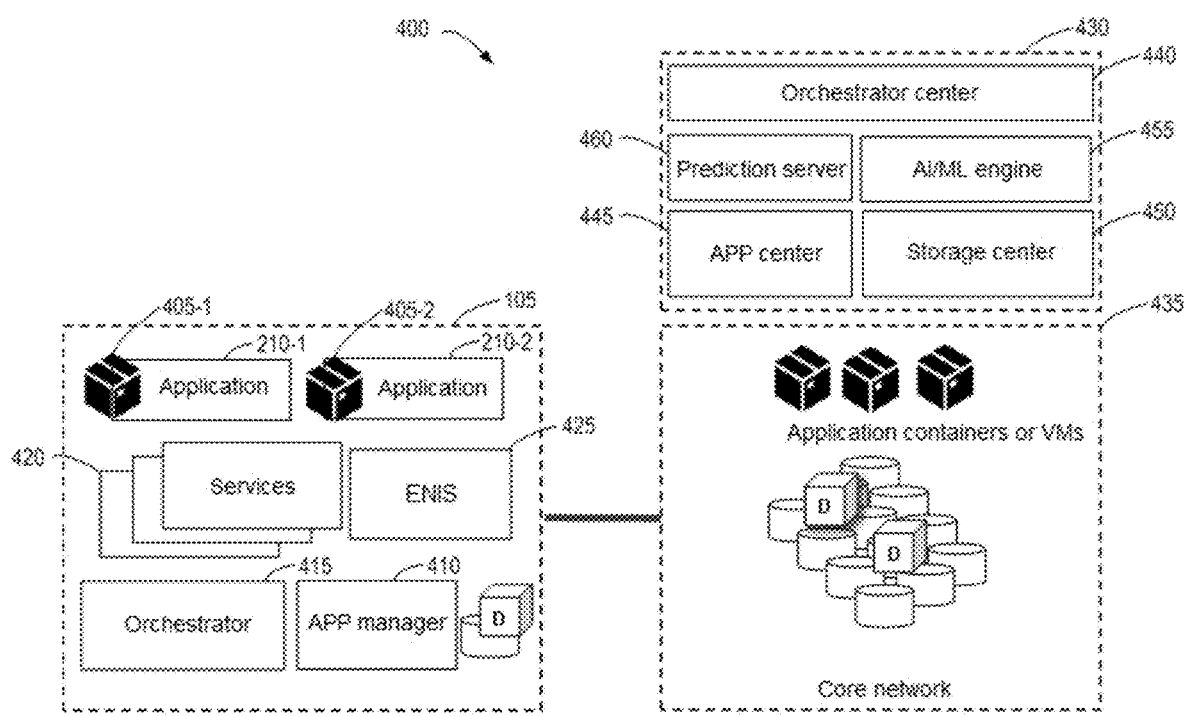
FIG. 4 shows an example high-level architecture of a system for edge resource aggregation according to some embodiments of the present disclosure.

FIG. 4 shows an example high-level architecture of system 400 for edge resource aggregation according to some embodiments of the present disclosure.

As shown in FIG. 4, in system 400, APPs 210-1 and 210-2 in edge device 105 can be packaged by application developers, or in some cases, by the network operator. According to the requirements and configuration of a platform (for example, platform 205 in FIG. 2), APPs 210-1 and 210-2 may be set as containers or Virtual Machines (VMs) 405-1 and 405-2, individually or collectively referred to as containers or VMs 405.

Edge device 105 also includes APP manager 410, which is used to perform application management, such as management of startup, instantiation, and termination. In addition, edge device 105 also includes orchestrator 415 for data management. These data include, for example, trained machine learning models, or predefined static data, such as navigation maps.

As shown in FIG. 4, edge device 105 provides services 420, which may be provided by APPs 210-1 and 210-2 or a platform (for example, platform 205 in FIG. 2). Services 420 may include any services currently known or to be developed in the future in aspects such as a Radio Access Network (RAN), User Equipment (UE), and bandwidth. In particular, edge device 105 also provides ENIS 425 for providing context information of edge device 105 to the service user.

System 400 also includes edge management center 430, which is used to perform data management on each edge device 105 in an edge device cluster (for example, edge device cluster 110 in FIG. 1). Edge management center 430 may be deployed on the side of core network 435. Alternatively, edge management center 430 may be arranged at the edge of the network together with edge device 105. In some embodiments, a certain edge device 105 may serve as edge management center 430 to perform data management on edge device cluster 110 to which the edge device 105 belongs.

As shown in FIG. 4, edge management center 430 includes multiple network functions (NFs), for example, including orchestrator center 440, which is responsible for orchestrating resources, including orchestrating application packages and related data.

Edge management center 430 also includes APP center 445, which is responsible for the management of the startup, instantiation, and termination of application packages. When APP manager 410 on edge device 105 receives a service request from a user, it can decide whether to approve the request, and check the availability of the application on the edge device 105 side. Similarly, in APP center 445, the user's permission and service level are checked, and then whether to approve the request or not is determined. If the request is approved, APP manager 410 forwards the request to orchestrator 415 for further processing.

In addition, edge management center 430 includes storage center 450, which is responsible for data storage and access authorization in edge management center 430, and also supports, together with APP center 445, orchestrator center 440 to orchestrate applications and data. Artificial Intelligence (AI)/Machine Learning (ML) engine 455 is an example of a general tool NF, which provides artificial intelligence and machine learning functions. Prediction server 460 is another example of the general tool NF, which is used to provide functions such as user location prediction. As shown in FIG. 4, a data storage device is also included on the core network 435 side, and is used for storing application containers or VMs and other data.

As mentioned above, edge device 105 can provide various services. These services can be provided through corresponding APIs. For example, corresponding services may be provided through APIs specified in 5G standards of the European Telecommunications Standards Institute (ETSI).

Figure 5:
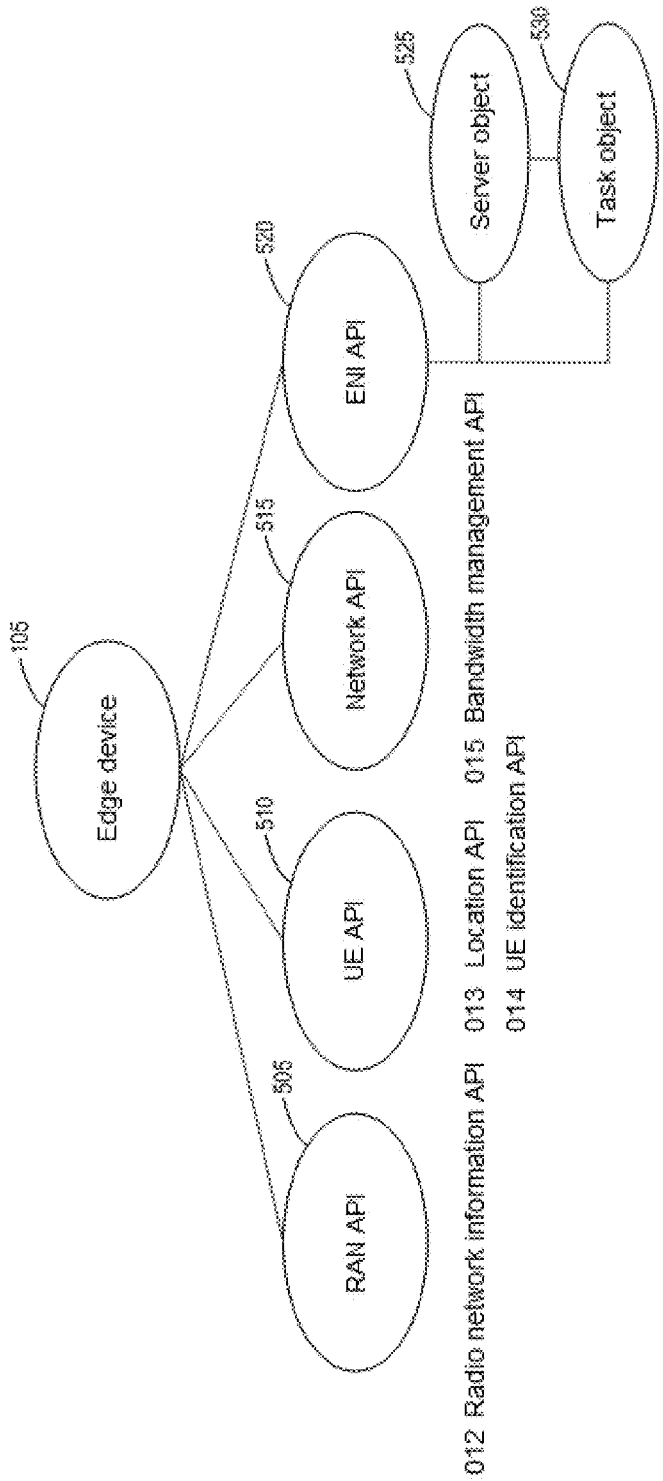
FIG. 5 shows example application programming interfaces (APIs) provided by an edge device according to some embodiments of the present disclosure.

FIG. 5 shows example APIs provided by edge device 105 according to some embodiments of the present disclosure.

As shown in FIG. 5, edge device 105 has RAN API 505, such as 012 radio network information API, for providing RAN related information. Edge device 105 also has UE API 510, such as 013 location API and 014 UE identification API, for providing UE-related information. Moreover, edge device 105 has network API 515, such as 015 bandwidth management API, for providing network connection related information.

In this example, edge device 105 has ENI API 520, which, for example, can provide information on two aspects, i.e., server object 525 and task object 530. The included example information is as follows:

1. Server Object
   1) Computer configurations of a Central Processing Unit (CPU), a memory, a hard disk, and a network, which may be reflected in functions of computing, storage, and network connections;
   2) One-degree edge device information, which can be acquired from an orchestrator center (for example, orchestrator center 440 as shown in FIG. 4);
   3) Supported GPU, TPU, or other function information; and
   4) Geographic location information of edge device 105.
2. Task Object
   1) Requirements for application instances/sessions in terms of delay, startup, bandwidth, and security, which are defined during the startup of application instances;
   2) Specific hardware requirements, such as GPU and TPU;
   3) Estimated execution time;
   4) Executed time (a combination of the estimated execution time, the executed time, and a remaining time of a task may be calculated); and
   5) Task status (started, in progress, pending, etc.).

For the estimated execution time, the latest records (for example, up to 10 records) may be averaged as a reference value. For a new application, the average value calculated by applications with similar functions may be referred to.

An example data structure of ENI API 520 is defined as follows:

TABLE 1

| Server Object | | | |
|---|---|---|---|
| Attribute name | Type of data | Radix | Description |
| Id | Integer | 1 | Identification of the edge devices, assigned by the orchestrator center |
| Hardware | Structure (internal) | | Hardware configuration, which can be reflected in computing, storage, and network connection capacities |
| >CPU | String type | 1 | CPU type and capacity |
| >memory | String type | 1 | Memory size |
| >NIC | String type | 1 . . . N | Network card capability |
| >disk | String type | 1 | Disk size |
| >GPU | Boolean | 1 | Whether supports GPU |
| >reserved | String type | 1 | Reserved for expansion |
| One-degree edges | | 1 . . . N | Geographically adjacent edge devices |
| Geography | | | |
| >latitude | Floating point | 1 | Latitude of location, expressed in the range of −90° to + 90° |

TABLE 1-continued

Server Object

| Attribute name | Type of data | Radix | Description |
|---|---|---|---|
| >longitude | Floating point | 1 | Longitude of location, expressed in the range of −180° to + 180° |
| >altitude | Floating point | 1 | Height of location, for example, refer to the World Geodetic System (WGS) 80 ellipsoid surface |

TABLE 2

Task Object

| Attribute name | Type of data | Radix | Description |
|---|---|---|---|
| Id | Integer | 1 | Identification of the edge devices, assigned by the orchestrator center |
| hardwareRequirement | Structure (internal) | 0 . . . 1 | Hardware requirements |
| >CPU | String type | 1 | CPU type and capacity |
| >memory | String type | 1 | Memory size |
| >NIC | String type | 1 . . . N | Network card capability |
| >disk | String type | 1 | Disk size |
| >GPU | Boolean | 1 | Whether supports GPU |
| serviceRequirement | | 0 . . . 1 | |
| >latency | Integer | 1 | Network end-to-end delay, expressed in milliseconds |
| >bandwidth | Integer | 1 | Data transmission bandwidth, expressed in mbps |
| >security | Enum | 1 | Security Level |
| Instances | | 1 . . . N | |
| > estimatedExecutionTime | Integer | 1 | Expressed in milliseconds |
| >executedTime | Integer | 1 | Expressed in milliseconds |
| > status | Enum | 1 | Status enumeration: Pending In progress Activated |

Through ENI API 520, relevant information such as capacity of edge device 105 and a task running thereon may be provided. According to the information, a resource balancing policy may be used among edge devices, thereby optimizing allocation of a resource pool of edge device cluster 110.

Figure 6:
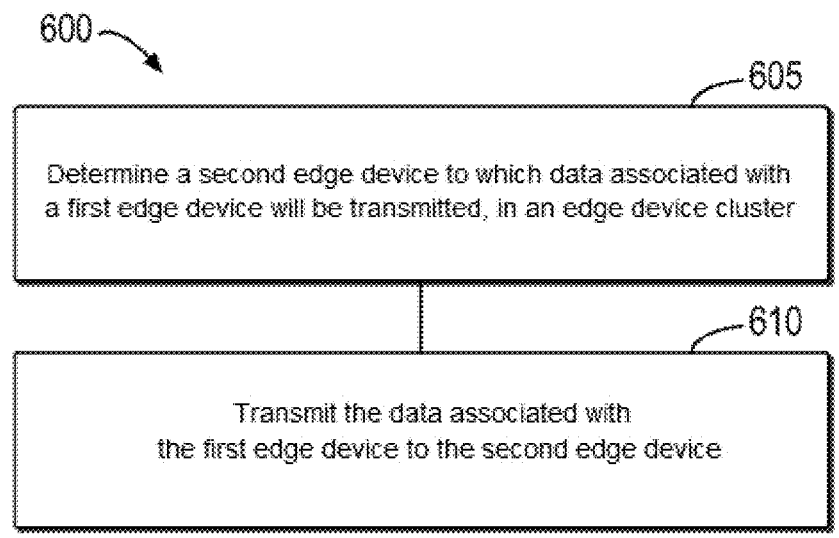
FIG. 6 shows a flow of a method for edge resource aggregation according to some embodiments of the present disclosure.

FIG. 6 shows a flowchart of method 600 for aggregating resources of edge device cluster 110 according to some embodiments of the present disclosure. Method 600 may be executed at edge devices 105 described in FIG. 1 or may be executed at edge management center 430 shown in FIG. 4.

As shown in FIG. 6, in block 605, another edge device (e.g., edge device 105-2) to which data associated with an edge device (e.g., edge device 105-1) will be transmitted is determined in edge device cluster 110. For ease of discussion, a source edge device (for example, edge device 105-1) is also referred to as a first edge device, and a target edge device (for example, edge device 105-2) to which data will be transmitted is also referred to as a second edge device. Data associated with the first edge device includes, for example, an application package running on the first edge device, application running status data and parameters, service data provided by the application, and the like. After the second edge device is determined, in block 610, data associated with the first edge device is transmitted to the second edge device.

In this way, the resources of edge device cluster 110 may be aggregated together to form a resource pool. Edge devices 105 in edge device cluster 110 may share resources with each other, instead of that each edge device 105 can only use its own local resource. As a result, in the event of load fluctuations or sudden changes, resources may be obtained from the resource pool, so that resource demand fluctuations may be handled more effectively.

In some embodiments, the above data transfer may be performed when terminal device 120 moves toward the second edge device. For example, in an embodiment where the first edge device is edge device 105-1 serving terminal device 120 in FIG. 1, if terminal device 120 moves toward edge device 105-2, it can be determined that edge device 105-2 is the second edge device. Then, service data (for example, including an application package and data) provided by the first edge device to terminal device 120 may be transmitted to the second edge device.

A delay in the application instantiation and data transmission may affect service continuity, so it is very important to eliminate the delay to ensure a seamless data communication. In some embodiments, loading of the application may be completed and the data may be ready before terminal device 120 moves to the area where the second edge device is located. In this way, the delay may be reduced to zero, thereby improving user experience.

Figure 7:
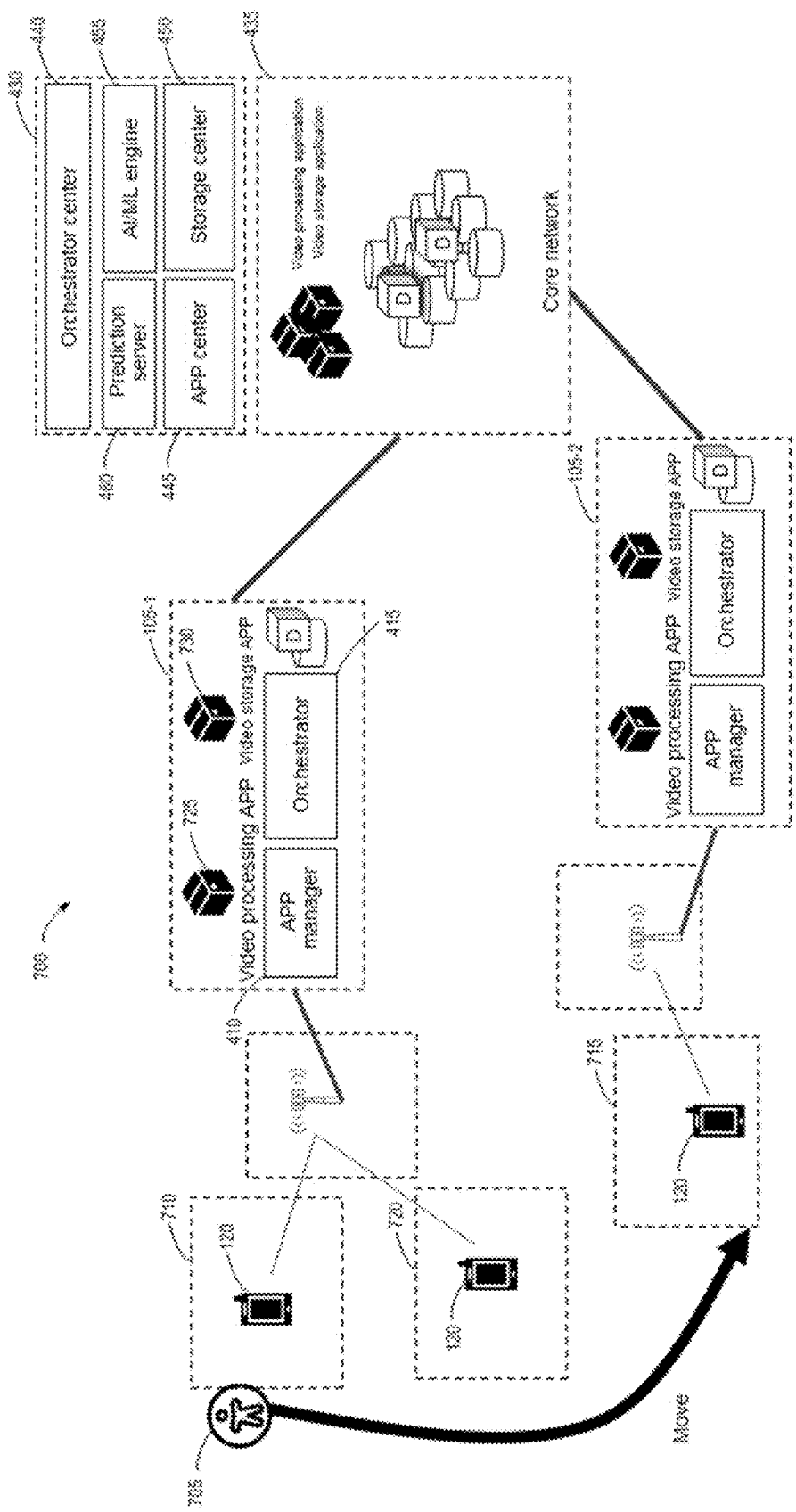
FIG. 7 shows an example scenario of data transmission in a mobile scenario of a terminal device according to some embodiments of the present disclosure.

FIG. 7 shows example scenario 700 of data transmission in a mobile scenario of terminal device 120 according to some embodiments of the present disclosure. In this example, the first edge device is edge device 105-1, and the second edge device is edge device 105-2. For ease of discussion, process 700 will be described with reference to FIG. 4.

In scenario 700, user 705 carrying terminal device 120 moves from location 710 to location 715, during which user 705 passes location 720. When terminal device 120 is located at the initial location 710, terminal device 120 is downloading a video from edge device 105-1. Correspondingly, video processing APP 725 and video storage APP 730 are installed in edge device 105-1.

Initially, video processing APP 725 and video storage APP 730 are not deployed on edge device 105-1. User 705 may request to deploy the two applications 725 and 730 on edge device 105-1. Assume that user 705 has a user service level for requesting to deploy the required applications on edge device 105-1, which is required in an authorization process through the APP.

Terminal device 120 may send a service request message to the connected edge device 105-1. APP manager 410 in edge device 105-1 can check the verification and the Service Level Agreement (SLA) level of user 705. If the request of user 705 is authorized, APP manager 410 forwards this message to orchestrator 415 for further processing. Then, the request message is sent to orchestrator center 440 in edge management center 430. Orchestrator center 440 checks the authorization and availability with the assistance of APP center 445 and storage center 450. If the verification is passed, orchestrator 415 in edge device 105-1 may start to download a relevant application package and data from core network 435 (for example, the cloud) to edge device 105-1, and install the application. In some embodiments, video processing APP 725 and video storage APP 730 may be prefetched to accelerate video processing.

During the movement, terminal device 120 may continuously report its location information to edge device 105-1. Edge device 105-1 may use a positioning-related application (not shown) to predict a location of terminal device 120. Alternatively or additionally, edge device 105-1 may also forward the location information of terminal device 120 to prediction server 460 and AI/ML engine 455 in edge management center 430. Prediction server 460 may analyze and predict the location information of terminal device 120 through deep learning. Any location estimation and prediction algorithm that is known or to be developed in the future may be used herein, and the scope of the present disclosure is not limited in this regard.

If the location of terminal device 120 is close to a switching boundary between two edge devices 105-1 and 105-2, orchestrator 415 in edge device 105-1 may trigger pre-caching for the application package and data of edge device 105-2. After the pre-caching, edge device 105-2 may instantiate and warm up the application package to wait for the UE to arrive at location 715 near edge device 105-2. When terminal device 120 moves to location 715, at edge device 105-2, the application has finished warming up and the data is ready. Correspondingly, a video download task of terminal device 120 may be seamlessly switched from edge device 105-1 to edge device 105-2, thereby avoiding service interruption and improving user experience.

A single edge device 105 cannot pre-cache all application packages due to its storage capacity limitation. Moreover, for some applications, additional initial data needs to be loaded together with the program packages, which will take up more storage resources. Through an on-demand resource allocation policy as described above, edge device 105-2 acquires application packages and data only when needed. In this way, service quality is guaranteed while storage resources are saved.

In some embodiments, aggregated resources of edge device cluster 110 may also be used for load balancing among edge devices 105. As mentioned above, due to cost reasons, it is difficult to deploy edge devices 105 according to peak demands. Therefore, in the event of a traffic burst, a single edge device 105 is likely to reach the capacity limit. According to an embodiment of the present disclosure, edge devices 105 in edge device cluster 110 can work together. In this case, it rarely happens that all edge devices 105 in edge device cluster 110 are overloaded.

By measuring and monitoring the resource consumption of each edge device 105, tasks or services of overloaded edge devices may be offloaded in time to other edge devices with idle resources. For example, when the resource consumption level of the first edge device is too high, for example, when it exceeds a threshold level, it may be determined that the service data provided by the first edge device is to be transmitted to the second edge device. By offloading resource requirements to adjacent edge devices, the aggregated resources of edge device cluster 110 can be effectively used. Compared with a traditional method of offloading resource requirements to the cloud, this method is more flexible and efficient.

Figure 8:
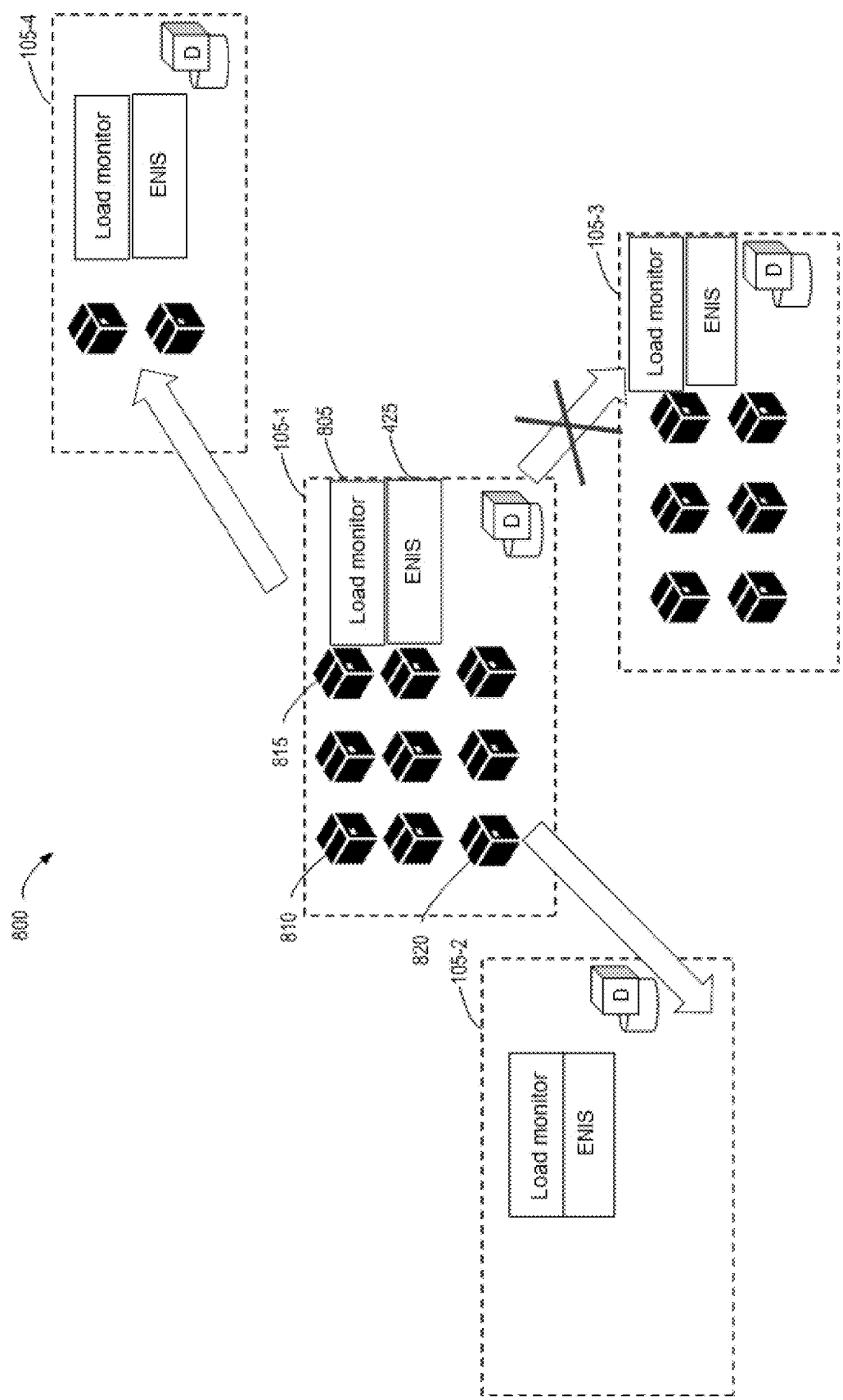
FIG. 8 shows an example scenario of load balancing among edge devices according to some embodiments of the present disclosure.

FIG. 8 shows example scenario 800 of load balancing among edge devices 105 according to some embodiments of the present disclosure.

In scenario 800, edge device 105-1 serves as the first edge device, and load monitor 805 therein monitors its own resource consumption. For example, load monitor 805 can acquire local context information through ENIS 425 and calculate a resource usage rate. Resources may include resources in aspects of computing, storage, and network connections (such as bandwidth). Load monitor 805 can compare the calculated resource usage rate with a threshold usage rate. If the resource consumption reaches or exceeds a threshold, edge device 105-1 may send an overload alarm. By measuring and monitoring the resource consumption, edge device 105-1 may monitor the capacity level and make an offloading decision in time.

In this example, the resource usage rate of edge device 105-1 is assumed to reach 85%, which exceeds a designated threshold usage rate (e.g., an 80% usage rate), thereby resulting in occurrence of overload. At this time, edge device 105-1 may acquire the context information of adjacent edge devices 105-2, 105-3, and 105-4 in edge device cluster 110 through ENIS 425. According to an amount of available resources of other edge devices 105-2, 105-3, and 105-4 and availability of hardware required for local service provision on the other edge devices 105-2, 105-3, and 105-4, edge device 105-1 may prioritize and select these edge devices. Edge device 105-1 may assign a pending task to a suitable edge device and update the status accordingly.

A task to be migrated and an edge device to undertake the task may be selected according to any suitable criteria. For example, application 810 running on edge device 105-1 has an extremely low delay requirement. Therefore, application 810 can be kept on edge device 105-1 in order to take advantage of the feature of low delay due to the fact that edge device 105-1 is close to terminal device 120.

In some embodiments, overloaded tasks may be assigned to suitable edge devices based on capacities of respective edge devices 105-2, 105-3, and 105-4. For example, application 815 on edge device 105-1 requires a GPU. If application 815 needs to be migrated, an edge device that supports the GPU may be selected. In this example, edge device 105-4 supports GPU. Therefore, it is determined to migrate application 815 to edge device 105-4.

In addition, application 820 on edge device 105-1 has a high demand for a codec, where codec is an abbreviation for "coder-decoder." In this way, an edge device with a codec hardware acceleration function is an ideal choice. In scenario 800, edge device 105-2 has a codec hardware acceleration function. Therefore, application 820 is migrated to edge device 105-2.

In some embodiments, considering that video services are the main load in the current network, and a user generally has various requirements for different types of video services, it is possible to deploy servers that can provide codec services on all edge devices 105 in edge device cluster 110. In this way, requirements for service coverage and availability can be met at the same time.

In scenario 800, edge device 105-3 is already close to overload, and its resource usage rate reaches 75%, for example. Therefore, edge device 105-3 is not a candidate. It should be understood that selection of a target edge device by edge device 105-1 is only an example, rather than a limitation. In some embodiments, the selection may be made by edge management center 430 shown in FIG. 4.

In some embodiments, the data transfer among edge devices 105 in edge device cluster 110 may also be performed in a user uploading and/or downloading scenario. For example, in a scenario of real-time video sharing or fast file sharing, in a traditional method, data such as videos or files will be uploaded to the cloud for sharing and downloading, which will introduce delays in both processes of uploading and downloading by the user. Moreover, only a single edge device acts as an access point, which may cause an access bottleneck. Through the cooperation among edge devices 105, storage and access functions may be distributed to multiple adjacent edge devices, which may provide multiple access points for the terminal device, thereby further improving network efficiency.

Figure 9:
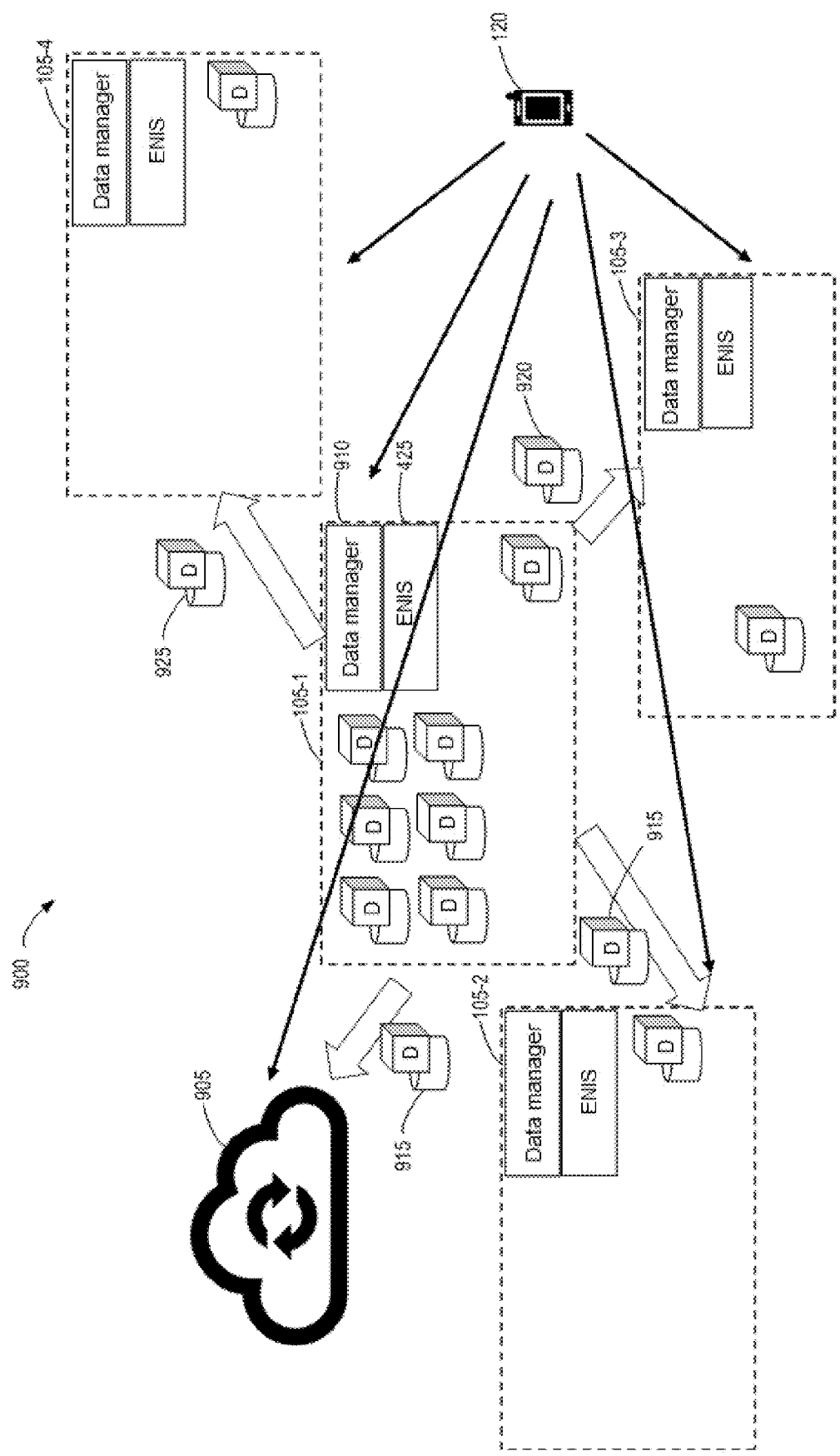
FIG. 9 shows an example scenario of real-time data sharing according to some embodiments of the present disclosure.

FIG. 9 shows example scenario 900 of real-time data sharing according to some embodiments of the present disclosure.

In scenario 900, terminal device 120 intends to upload data. Unlike a traditional method, data is not directly uploaded to cloud 905 by terminal device 120, but is first uploaded to the nearest edge device 105-1 according to the information of edge device 105-1 acquired by using ENIS 425. Edge device 105-1 may have segmented blocks or all copies of the content uploaded by terminal device 120. After receiving the data uploaded by terminal device 120, edge device 105-1 transmits at least a part of the data to other edge devices 105-2, 105-3, and 105-4 in edge device cluster 110. A data segmentation method adopted by edge device 105-1 may be notified to terminal device 120 through data manager 910, so that terminal device 120 may merge the content in the future. In order to support the UE connection, as shown in FIG. 9, related applications 915, 920, and 925 may also be copied to corresponding edge devices 105-2, 105-3, and 105-4.

Data transmission among edge devices is much faster, so multiple access points including edge device 105-1 that serve as a current master host are quickly made available. Correspondingly, other terminal devices may access all or part of the content from all edge devices 105-1, 105-2, 105-3, and 105-4 without waiting for completion of the downloading from a slave host. After receiving all the segmented blocks, the terminal device may combine all the segmented blocks together based on the notification from data manager 910 so as to construct a complete content.

Temporary blocks on edge devices 105-1, 105-2, 105-3, and 105-4 may be reserved for a period of time according to the user's request based on the service level, and finally may be moved to cloud 905 for permanent storage. If a temporary sharing policy is used, it can be deleted directly.

A single access point may become a connection bottleneck due to hardware performance limitations. Through the cooperation of multiple edge devices, the connection may be expanded from a single point to multiple points, thereby greatly improving network efficiency and stability.

The following discusses an example use case, i.e., a marathon live broadcast, of a resource aggregation mechanism according to an embodiment of the present disclosure. For a marathon race, there is a significant challenge to the network load in terms of computing, storage, and network connections.

In a mobile scenario of this use case, parties and activities are as follows:

1. An autonomous broadcast vehicle responsible for the live broadcast, in-vehicle activities including:
   1) video uploading and online broadcasting, and
   2) autonomous driving navigation using a machine learning engine.
2. Spectators, who take videos of marathon runners and upload them to the Internet.
3. Athletes using wearable devices to monitor their physical conditions.

With the continuous movement of the athletes and broadcast vehicle, data services used are constantly shifted from one edge device to another edge device throughout the whole marathon route to ensure that data broadcasting services and machine learning services may run smoothly at each switch point among the edge devices. Video processing applications, machine learning applications, and related data may be pre-cached to ensure service continuity. In particular, the autonomous machine learning engine may be pre-cached and warmed up so that it can run quickly in advance with key navigation and training model data, thereby ensuring that the broadcast vehicle can drive safely in the crowd.

When the athletes pass through the area where edge device 105 is located, the spectators may shoot videos, and some of the videos may be uploaded to an application server for sharing. Therefore, the volume of data traffic in this area may be much higher than normal. Moreover, since the video processing service has high requirements for computing, storage, and network connection functions, edge device 105 that provides the service may become overloaded. The load may be transferred to an adjacent edge device. Among the candidate edge devices, an edge device with a codec function may be preferentially selected. Regarding applications to be removed, in addition to a pending application that is not sensitive to a delay, a wearable-device Internet of Things (IoT) application with relatively low requirements on delay and bandwidth may also be a candidate.

In addition, both the broadcast vehicle and the spectators broadcast live situations on the site, which may cause traffic congestion. According to a service priority, one or some services with higher priority may be provided by multiple edge devices in cooperation, so as to, for example, meet SLA requirements of key users. In addition, as an entrance public channel, it is necessary to ensure service quality of live broadcast of the broadcast vehicle. Multi-point access may be provided through the cooperation of adjacent edge devices, thereby avoiding the single-point bottleneck. For example, the live broadcast vehicle can distribute content to multiple adjacent edge devices, so that each edge device can have a complete or partial copy of the content. The content may be used as another video source for an end user, thereby effectively solving or alleviating the problem of network congestion.

It should be understood that the operations and features described above in conjunction with FIG. 1 to FIG. 5 are also applicable to method 600 and have the same effect, and the specific details will not be repeated.

Figure 10:
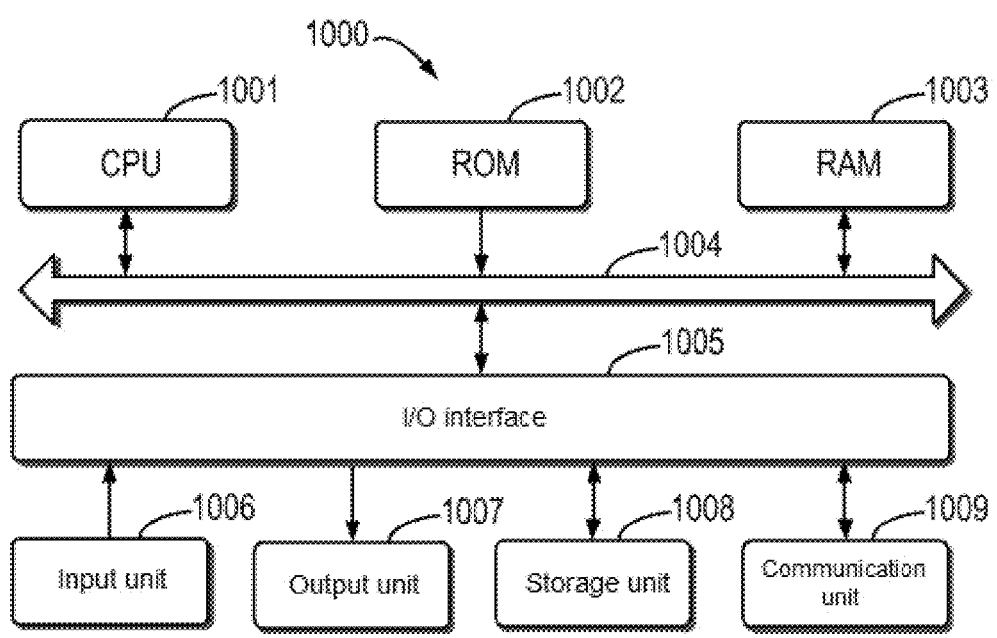
FIG. 10 shows a block diagram of a device that is suitable for implementing the embodiments of the present disclosure.

FIG. 10 is a schematic block diagram of device 1000 that may be used to implement an embodiment of the present disclosure.

As shown in FIG. 10, device 1000 includes a controller or processor, which may be referred to as central processing unit (CPU) 1001 that may perform various appropriate actions and processing according to programs stored in read-only memory (ROM) 1002 and/or random access memory (RAM) 1003. In ROM 1002 and/or RAM 1003, various programs and data required for the operation of storage device 1000 may be stored. CPU 1001, ROM 1002, and RAM 1003 are connected to each other through bus 1004. In particular, device 1000 further includes one or more dedicated processing units (not shown) that may also be connected to bus 1004.

Input/output (I/O) interface 1005 is also connected to bus 1004. Multiple components in device 1000 are connected to I/O interface 1005, including: input unit 1006, such as a keyboard and a mouse; output unit 1007, such as various types of displays and speakers; storage unit 1008, such as a magnetic disk and an optical disc; and communication unit 1009, such as a network card, a modem, and a wireless communication transceiver. Communication unit 1009 allows device 1000 to exchange information/data with other devices over a computer network such as the Internet and/or various telecommunication networks. In particular, in an embodiment of the present disclosure, communication unit 1009 supports communication with clients or other devices.

In some embodiments, CPU 1001 may be configured to execute the various processes and processing described above, such as method 600. For example, in some embodiments, method 600 may be implemented as a computer software program that is tangibly included in a machine-readable medium such as storage unit 1008. In some embodiments, part or all of the computer program may be loaded and/or installed onto device 1000 via ROM 1002 and/or communication unit 1009. When the computer program is loaded to RAM 1003 and executed by CPU 1001, one or more steps of method 600 described above may be performed. Alternatively, in other implementations, CPU 1001 may also be configured in any other suitable manner to implement the above-mentioned process/method.

Particularly, according to the embodiments of the present disclosure, the processes described with reference to FIG. 1 to FIG. 9 may be implemented as a computer program product, which may be tangibly stored in a non-transitory computer-readable medium and includes computer-executable instructions. The computer-executable instructions, when executed, cause a device to execute various aspects according to the present disclosure.

The computer-readable storage medium may be a tangible device that can store instructions used by an instruction execution device. For example, the computer-readable storage medium may include, but is not limited to, an electrical storage device, a magnetic storage device, an optical storage device, an electromagnetic storage device, a semiconductor storage device, or any appropriate combination of the above. More specific and non-exhaustive examples of computer-readable storage media include: a portable computer disk, a hard disk, RAM, ROM, an erasable programmable read-only memory (EPROM or a flash memory), a static random access memory (SRAM), a portable compact disc read-only memory (CD-ROM), a digital disc (DVD), a memory stick, a floppy disk, a mechanical encoding device, for example, a punch card or a raised structure in a groove with instructions stored thereon, and any appropriate combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Java, Smalltalk, and C++, and conventional procedural programming languages, such as the "C" language or similar programming languages. Computer-readable program instructions may be executed entirely on a user's computer, partly on a user's computer, as a stand-alone program package, partly on a user's computer and partly on a remote computer, or entirely on a remote computer or server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute computer-readable program instructions so as to implement various aspects of the present disclosure.

Various aspects of the present disclosure are described herein with reference to block diagrams and/or flowcharts of the device, the method, and the computer program product according to embodiments of the present disclosure. It should be understood that each block in the block diagrams and/or flowcharts as well as a combination of blocks in the block diagrams and/or flowcharts may be implemented by using the computer-readable program instructions.

Various embodiments of the present disclosure have been described for the purpose of example, but the present disclosure is not intended to be limited to the disclosed embodiments. Without departing from the substance of the present disclosure, all modifications and variations fall within the protection scope of the present disclosure defined by the claims.

What is claimed is:

1. A method for edge resource aggregation, comprising:
   determining, in an edge device cluster, a second edge device to which data associated with a first edge device will be transmitted; and
   transmitting the data associated with the first edge device to the second edge device;
   wherein the data associated with the first edge device comprises data of a service provided by the first edge device, and determining the second edge device comprises:
   in response to a resource consumption level of the first edge device exceeding a threshold level, receiving context information of adjacent edge devices in the edge device cluster, prioritizing the adjacent edge devices based at least in part on the context information, and determining the second edge device to which the data of the service provided by the first edge device will be transmitted; and wherein determining the second edge device to which the data of the service provided by the first edge device will be transmitted comprises:

acquiring information about at least (i) an amount of available resources, and (ii) availability of one or more particular hardware acceleration devices, separate from the amount of available resources, required for the provision of the service of the edge devices in the edge device cluster; and based on the acquired information, determining the second edge device in the edge device cluster.

2. The method according to claim 1, wherein the service provided by the first edge device is provided by the first edge device to a terminal device, and determining the second edge device comprises:

in response to a determination that the terminal device is moving toward the second edge device, determining the second edge device to which the data of the service provided by the first edge device to the terminal device will be transmitted.

3. The method according to claim 2, wherein transmitting the data associated with the first edge device to the second edge device comprises:

pre-caching, at the second edge device, the data of the service provided by the first edge device to the terminal device.

4. The method according to claim 1, wherein transmitting the data associated with the first edge device to the second edge device comprises:

from a service set currently provided by the first edge device, selecting a service to be removed based on delay requirements of services in the service set; and causing data associated with the selected service to be transmitted as the data associated with the selected service to the second edge device.

5. The method according to claim 1, wherein the data associated with the first edge device comprises a part of data uploaded by a terminal device to the first edge device.

6. The method according to claim 1, wherein the edge devices in the edge device cluster are configured to provide codec services.

7. The method according to claim 1, wherein the edge devices in the edge device cluster are configured to provide application programming interfaces (APIs) for a service user to acquire context information of the edge devices.

8. A device for edge resource aggregation, comprising:
a processor; and
a memory having computer-executable instructions stored therein, wherein the computer-executable instructions, when executed by the processor, cause the device to execute actions, and the actions comprise:

determining, in an edge device cluster, a second edge device to which data associated with a first edge device will be transmitted; and transmitting the data associated with the first edge device to the second edge device;

wherein the data associated with the first edge device comprises data of a service provided by the first edge device, and determining the second edge device comprises:

in response to a resource consumption level of the first edge device exceeding a threshold level, receiving context information of adjacent edge devices in the edge device cluster, prioritizing the adjacent edge devices based at least in part on the context information, and determining the second edge device to which the data of the service provided by the first edge device will be transmitted; and wherein determining the second edge device to which the data of the service provided by the first edge device will be transmitted comprises:

acquiring information about at least (i) an amount of available resources, and (ii) availability of one or more particular hardware acceleration devices, separate from the amount of available resources, required for the provision of the service of the edge devices in the edge device cluster; and based on the acquired information, determining the second edge device in the edge device cluster.

9. The device according to claim 8, wherein the service provided by the first edge device is provided by the first edge device to a terminal device, and determining the second edge device comprises:

in response to a determination that the terminal device is moving toward the second edge device, determining the second edge device to which the data of the service provided by the first edge device to the terminal device will be transmitted.

10. The device according to claim 9, wherein transmitting the data associated with the first edge device to the second edge device comprises:

pre-caching, at the second edge device, the data of the service provided by the first edge device to the terminal device.

11. The device according to claim 8, wherein transmitting the data associated with the first edge device to the second edge device comprises:

from a service set currently provided by the first edge device, selecting a service to be removed based on delay requirements of services in the service set; and causing data associated with the selected service to be transmitted as the data associated with the selected service to the second edge device.

12. The device according to claim 8, wherein the data associated with the first edge device comprises a part of data uploaded by a terminal device to the first edge device.

13. The device according to claim 8, wherein the edge devices in the edge device cluster are configured to provide codec services.

14. The device according to claim 8, wherein the edge devices in the edge device cluster are configured to provide application programming interfaces (APIs) for a service user to acquire context information of the edge devices.

15. A computer program product tangibly stored in a non-transitory computer-readable medium and comprising machine-executable instructions, wherein the machine-executable instructions, when executed, cause a machine to perform a method for edge resource aggregation, the method comprising:

determining, in an edge device cluster, a second edge device to which data associated with a first edge device will be transmitted; and transmitting the data associated with the first edge device to the second edge device;

wherein the data associated with the first edge device comprises data of a service provided by the first edge device, and determining the second edge device comprises:

in response to a resource consumption level of the first edge device exceeding a threshold level, receiving context information of adjacent edge devices in the edge device cluster, prioritizing the adjacent edge devices based at least in part on the context information, and determining the second edge device to which the data of the service provided by the first edge device will be transmitted; and wherein determining the second edge device to which the data of the service provided by the first edge device will be transmitted comprises:

acquiring information about at least (i) an amount of available resources, and (ii) availability of one or more particular hardware acceleration devices, separate from the amount of available resources, required for the provision of the service of the edge devices in the edge device cluster; and based on the acquired information, determining the second edge device in the edge device cluster.

16. The computer program product according to claim 15, wherein the service provided by the first edge device is provided by the first edge device to a terminal device, and determining the second edge device comprises:

in response to a determination that the terminal device is moving toward the second edge device, determining the second edge device to which the data of the service provided by the first edge device to the terminal device will be transmitted.

17. The computer program product according to claim 15, wherein transmitting the data associated with the first edge device to the second edge device comprises:

from a service set currently provided by the first edge device, selecting a service to be removed based on delay requirements of services in the service set; and causing data associated with the selected service to be transmitted as the data associated with the selected service to the second edge device.

18. The computer program product according to claim 15, wherein the data associated with the first edge device comprises a part of data uploaded by a terminal device to the first edge device.

19. The computer program product according to claim 15, wherein the edge devices in the edge device cluster are configured to provide codec services.

20. The computer program product according to claim 15, wherein the edge devices in the edge device cluster are configured to provide application programming interfaces (APIs) for a service user to acquire context information of the edge devices.

* * * * *